US006285094B1

(12) United States Patent
Fest, Sr.

(10) Patent No.: US 6,285,094 B1
(45) Date of Patent: Sep. 4, 2001

(54) LOOP-POWERED CURRENT-LOOP CONTROLLER AND METHOD

(76) Inventor: Otto P. Fest, Sr., 6807 E. Camino Bel Dorado, Tucson, AZ (US) 85715

( * ) Notice: Subject to any disclaimer, the term of this patent is extended or adjusted under 35 U.S.C. 154(b) by 0 days.

(21) Appl. No.: 09/393,073

(22) Filed: Sep. 7, 1999

Related U.S. Application Data

(60) Provisional application No. 60/100,648, filed on Sep. 16, 1998.

(51) Int. Cl.[7] .......... H04B 1/00

(52) U.S. Cl. .......... 307/125; 340/310.01

(58) Field of Search .......... 327/365, 479; 307/125, 130, 131; 340/815.45, 815.89, 825.17, 664, 654, 513, 310.01, 310.06

(56) References Cited

U.S. PATENT DOCUMENTS

| | | | | |
|---|---|---|---|---|
| 4,090,121 | * | 5/1978 | Nelson et al. | 318/610 |
| 4,271,505 | * | 6/1981 | Menot et al. | 370/400 |
| 4,344,128 | * | 8/1982 | Frye | 318/561 |
| 5,295,037 | * | 3/1994 | Dougherty | 361/93 |
| 5,633,651 | * | 5/1997 | Carvajal et al. | 340/815.45 |
| 5,684,451 | * | 11/1997 | Seberger et al. | 340/310.01 |

* cited by examiner

*Primary Examiner*—Josie Ballato
*Assistant Examiner*—Roberto Rios
(74) *Attorney, Agent, or Firm*—McCormick, Paulding & Huber LLP

(57) ABSTRACT

An apparatus in the form of a current-loop controller driven by the EMF in the loop without the need for external power operates devices connected in the loop (in series) within the current operating range.

5 Claims, 1 Drawing Sheet

LOOP-POWERED CURRENT-LOOP CONTROLLER AND METHOD

PRIORITY DOCUMENTS

This application corresponds to and derives priority from U.S. Provisional Application Ser. No. 60/100,648, filed Sep. 16, 1998

TECHNICAL FIELD

The present invention relates to electric control circuits and, more particularly, to a method and apparatus for using a self-powered current loop to transmit a process variable using only the current that drives the loop.

BACKGROUND AND OBJECTS OF THE INVENTION

The use of current loops enables the most popular, safe and easy method of transmitting a process variable to a distance limited only by the electromotive force (EMF) that drives the loop. A current loop's simple, two-wire connection allows for fast and simple interconnection to as many devices in the loop (in series) as desired, limited only by the loop's EMF.

Traditional current-loop controllers are externally powered through AC Mains or direct current voltage. They are expensive, complex and bulky. It is desirable, then, to provide a current-loop controller that avoids these shortcomings and that has other advantages as described below. The control circuit should, in addition to driving desired devices, be able to provide, control, and/or indicate outputs and control or manage processes.

SUMMARY OF THE INVENTION

The present invention is directed to an apparatus in the form of a current-loop controller and associated method that is driven by the EMF in the loop. The current-loop controller provides, controls and indicates output to control and manage a process without the need for external power. Since the current industry standard for current-loops is 4–20 maDC, the preferred embodiment is designed to reliably operate devices connected in the loop (in series) within the current operating range of 4–20 mA. This is not, however, intended to limit the present invention to such range.

In the preferred embodiment of the controller electric current is initially applied to the circuit formed by the controller, causing a first light-emitting diode (LED) and a first pair of transistors to tum on. The transistors allow current to flow through a zener diode and a resistor, and out to an –L current loop to close the circuit. A zener diode regulates voltage extracted from the current to power another reference diode and a comparator. If the signal variable monitored by the first resistor drops below the set point value of the comparator, the comparator will switch its output to a high (VCC) level turning the first transistor off and allowing the current to flow through an LED, the opto-isolator's internal LED, another diode, and a second transistor which is on. The opto-isolator's internal LED turns on its phototransistor causing its collector and emitter terminals to have a very low resistance energizing and external device.

When the signal variable exceeds the set point value of the first comparator, it switches to low (ground) turning on the first transistor which turns off the LED and the opto-isolator's internal LED and phototransistor. The same is true for the high-limit second comparator, but in reverse. If the signal in the current loop exceeds the set point, the second comparator will turn off the second transistor, thereby routing the current through its associated LED and opto-isolator turning on the LED and phototransistors in the same manner as in the "low" comparator, but reversed for "high" comparison.

DESCRIPTION OF THE PREFERRED EMBODIMENT

Figure 1:
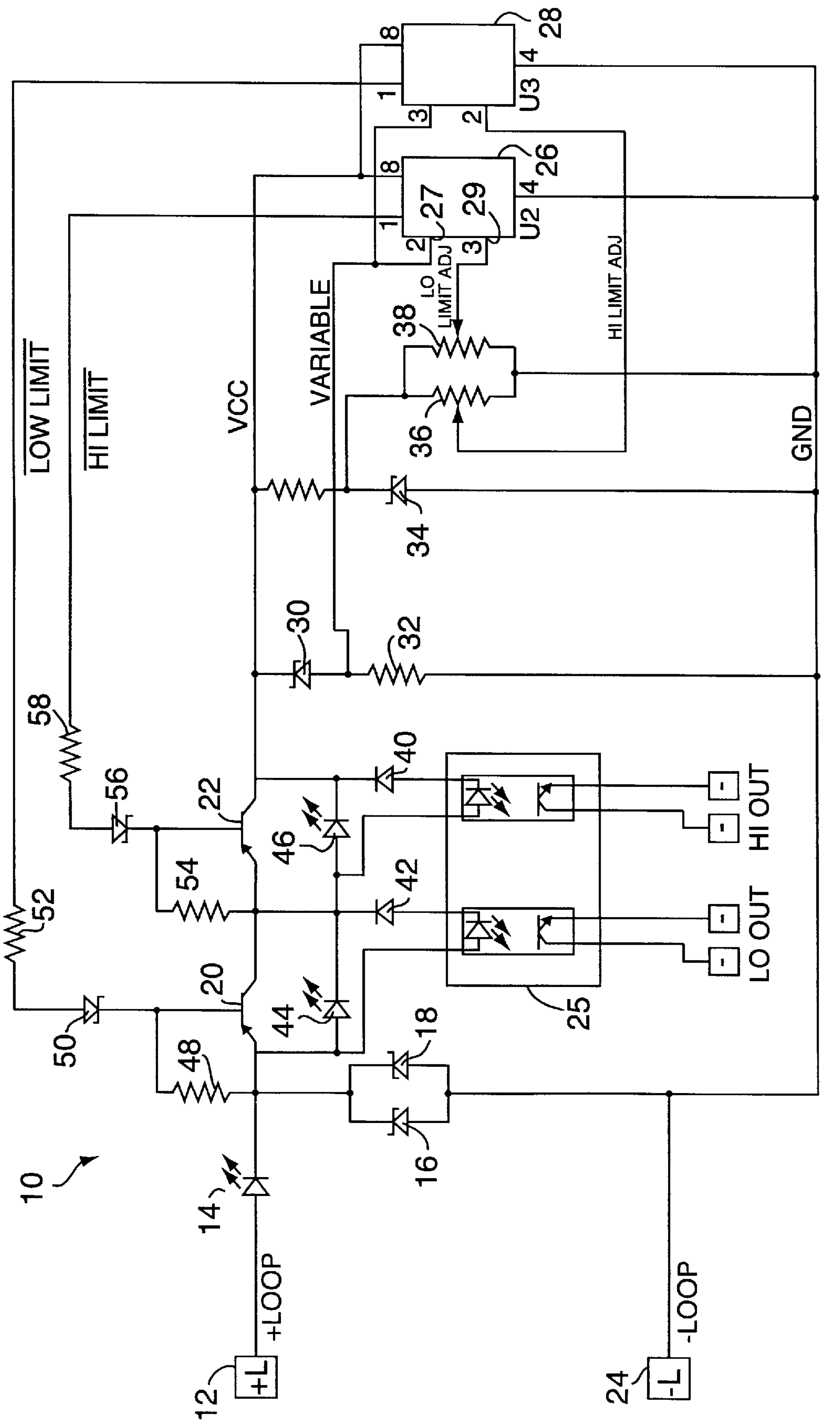
FIG. 1 is a schematic diagram of the preferred embodiment controller according to the present invention.

Referring to the circuit diagram illustrated in FIG. 1, a circuit (10) forms a loop-powered controller according to the present invention. The +L current is applied to the first terminal (12). A first light-emitting diode (LED) (14) is provided to prevent reversed voltage from damaging circuitry and to give a visual display indicative of current flow in the loop. First and second zener diodes (16, 18) protect the circuitry from over-voltages that may result from inadvertent connections. First and second transistors (20, 22), when "on" (no alarm condition), pass the current through the circuitry and the flow out to the –L current-loop (24). From the instant current is applied, first and second voltage comparators (26, 28) are off (low) and the transitors (20, 22) are "on." A third zener diode (30) clamps the loop's current to a voltage for safe operation of the circuitry. A first resistor (32) converts that current flow to voltage (current shunt) for the comparators (26, 28) variable input. A fourth diode (34) is a voltage reference for the comparators' (26, 28) set points through potentiometers (36, 38) to compare to the variables at its pins (27, 29). Upon the limit (set point) being exceeded, the output of one of the comparators (26 or 28) switches from "Low" to "High" turning pass transistor (20 or 22) off, forcing the current to flow through the opto-isolator (25) LED turning its phototransistor on, energizing their load and at the same time turning "on" one of the LEDs (44 or 46) for visual indication of out of limit condition. A pair of diodes (40, 42) compensate for voltage drop across the opto-isolator's (25) photodiodes for the LEDs (44 or 46) to operate. Since the voltage level at the collector of the transistors (20 or 22) changes due to the voltage drop across the diodes (44 or 46), the internal LEDs of the opto-isolator (25) and the magnitude of the current loop, the circuit combination of the resistor (48), the diode (50), and the resistor (52)—or the resistor (54), the diode (56), and the resistor (58)—are used to shift the voltage level at the base of the transistors (20 or 22) for their correct "on-off" operation from the logic level output of the first comparator (26) or the second comparator (28).

In operation, the preferred embodiment controller (10) operates as described below. When electric current is initially applied to the circuit formed by the controller (10), the first LED (14) turns on and the first and second transistors (20, 22) turn on. The transistors (20, 22) allow current to flow through the third zener diode (30) and the first resistor (32) and out to the –L current loop (24) closing the circuit. The third zener diode (30) regulates voltage extracted from the current to power the fourth diode (34) and the comparators (26, 28). If the signal variable monitored by the first resistor (32) drops below the set point value of the second comparator (28), the second comparator (28) will switch its output to a high (VCC) level turning the first transistor (20) off and allowing the current to flow through the diode (44), the opto-isolator's (25) internal LED (not shown), the diode (42), and the second transistor (22) which is on. The optoisolator's (25) internal LED turns on its phototransistor causing its collector and emitter terminals to have a very low resistance energizing an external device.

When the signal variable exceeds the set point value of the second comparator (28), it switches to low (ground) turning on the first transistor (20) which turns off the diode (44) and the opto-isolator's (25) internal LED and phototransistor. The same is true for the high-limit first comparator (26), but in reverse. If the signal in the current loop exceeds the set point, the first comparator (26) will turn off the second transistor (28), thereby routing the current to the diodes (46, 40) and the second opto-isolator half (25).

The loop-powered technique described herein and its low component count and size allows the controller (10) of the present invention to be used anywhere within the "loop" run

What is claimed is:

1. A self-powered, current-loop controller for controlling a process variable, said controller comprising a first light-emitting diode for indicating the presence of and controlling direction of electric current flow in said controller;

a first zener diode for regulating voltage levels of said current;

a pair of transistors, each for controlling current flow between an on position and an off position, and for controlling on-off signal outputs;

at least one resistor for converting said current into a first voltage signal;

a second zener diode for regulating a set point voltage signal;

a first voltage comparator for comparing said first voltage signal to said set point voltage signal, and for controlling operation of said transistors such that when said first voltage signal exceeds said set point voltage, said first voltage comparator turns one of said transistors to said off position thereby causing said current to flow through an associated LED for visual indication and through an associated opto-isolator for controlling said process variable;

a third zener diode for compensating for voltage drop across one of said transistors; and voltage shifting means for shifting voltage level at the base of said transistors to a level at which said transistors are operable.

2. A controller according to claim 1, wherein said voltage shifting means comprise a pair of resistors and a zener diode connected in series with respect to each other, and in parallel at the base input of the transistor so as to compensate for the level shifting of the transistor's collector and emitter voltages when they are turned on or off.

3. A self-powered, current-loop controller for controlling a process variable, said controller comprising current-direction control means for controlling direction of electric current flow in said controller;

voltage regulating means for regulating voltage levels of said current;

current-flow control means for controlling current flow between an on position and an off position;

current-conversion means for converting said current into a first voltage signal;

voltage reference means for determining a set point voltage signal;

first voltage comparing means for comparing said first voltage signal to said set point voltage signal, and for controlling operation of said current-flow control means such that when said first voltage signal exceeds said set point voltage, said current-flow control means causes said current to flow through an associated LED for visual indication and through an associated opto-isolator for controlling said process variable;

voltage compensation means compensating for voltage drop across one of said transistors; and voltage shifting means for shifting voltage level at the base of said transistors to a level at which said transistors are operable.

4. A controller according to claim 3, wherein said voltage shifting means comprise a pair of resistors and a zener diode connected in series with respect to each other, and in parallel at the base input of the transistor so as to compensate for the level shifting of the transistor's collector and emitter voltages when they are turned on or off.

5. A method of controlling a process variable in a self-powered current loop, said method comprising applying electric current to a circuit;

directing said current to a first LED thereby causing it to turn on;

directing said current to first and second transistors thereby causing them to turn on, whereby said transistors allow current to flow through a first zener diode and a first resistor and out to a current loop closing the circuit;

regulating voltage extracted from the current to power a second diode, a first comparator, and an opto-isolator;

determining if a signal variable representative of said process variable monitored by the first resistor drops below a set point value of the first comparator, whereby the first comparator switches its output to a high (VCC) level turning the first transistor off and allowing the current to flow through the opto-isolator's internal LED and said second transistor so that the opto-isolator's internal LED turns on its phototransistor causing its collector and emitter terminals to have a very low resistance energizing an external device for controlling said process variable; and determining if said signal variable exceeds the set point value of the first comparator, whereby the first comparator switches to low (ground) turning on the first transistor which turns off the opto-isolator's internal LED and phototransistor.

* * * * *